US009357060B2

(12) United States Patent
Canto Fuertes et al.

(10) Patent No.: US 9,357,060 B2
(45) Date of Patent: May 31, 2016

(54) TELECOMMUNICATIONS SYSTEM AND METHOD WHICH MAKES IT POSSIBLE TO ESTABLISH TELECOMMUNICATIONS WITH A VEHICLE USER BY MEANS OF THE NUMBER PLATE

(75) Inventors: Juan Francisco Canto Fuertes, Madrid (ES); Juan Jose Espinar Arcones, Boadilla del Monte (ES); Felipe De La Fuente Fernandez, Madrid (ES)

(73) Assignee: PERSON TO VEHICLE S.L., Madrid (ES)

( * ) Notice: Subject to any disclaimer, the term of this patent is extended or adjusted under 35 U.S.C. 154(b) by 85 days.

(21) Appl. No.: 14/375,598

(22) PCT Filed: Jan. 31, 2012

(86) PCT No.: PCT/ES2012/070061
§ 371 (c)(1),
(2), (4) Date: Sep. 11, 2014

(87) PCT Pub. No.: WO2013/113951
PCT Pub. Date: Aug. 8, 2013

(65) Prior Publication Data
US 2015/0017955 A1  Jan. 15, 2015

(51) Int. Cl.
*H04M 3/42* (2006.01)
*H04Q 3/72* (2006.01)
(Continued)

(52) U.S. Cl.
CPC ......... *H04M 3/4211* (2013.01); *H04L 61/1535* (2013.01); *H04M 3/42229* (2013.01); *H04Q 3/72* (2013.01); *H04W 4/025* (2013.01); *G06K 9/3258* (2013.01); *G06K 2209/15* (2013.01);
(Continued)

(58) Field of Classification Search
CPC . G06K 2209/15; B60R 25/10; H04M 3/4211; H04M 3/42229
See application file for complete search history.

(56) References Cited

U.S. PATENT DOCUMENTS

| | | | | |
|---|---|---|---|---|
| 5,668,880 | A * | 9/1997 | Alajajian | H04B 1/707 370/335 |
| 2004/0082350 | A1* | 4/2004 | Chen | H04L 63/10 455/518 |
| 2010/0214419 | A1 | 8/2010 | Kaheel et al. | |

FOREIGN PATENT DOCUMENTS

| KR | 10-2011-0054856 A | 5/2011 |
|---|---|---|
| TW | 201028658 A | 8/2010 |

OTHER PUBLICATIONS www.bump.com: download & faq pp. 3-4, May 2011 [retrieved on Dec. 7, 2012] [retrieved from http://web.archive.org/web/20110504025934/http://www.bump.com/download] [retrieved from http://web.archive.org/web/20110503173908/http://www.bump.com/faq].

(Continued)

*Primary Examiner* — Curtis Odom
(74) *Attorney, Agent, or Firm* — Sughrue Mion, PLLC

(57) ABSTRACT

A communication system and method is disclosed which makes it possible to establish telecommunications with the vehicle user by the vehicle number plate code, making it possible to establish telecommunications with the vehicle owner by the public number and unique identification, thereby linking them to a communication system of the owner's choice (a mobile telephone number, e-mail, web profile or personal analog communication means), which is hidden from third parties, as well linking the users to certain pre-established communication functions (functionality codes), which respond to concrete needs of the users.

20 Claims, 5 Drawing Sheets

(51) Int. Cl.
*H04W 4/02* (2009.01)
*H04L 29/12* (2006.01)
*G06K 9/32* (2006.01)
*H04L 29/08* (2006.01)

(52) U.S. Cl.
CPC ........... *H04L 67/125* (2013.01); *H04L 67/2814* (2013.01); *H04Q 2213/13095* (2013.01); *H04Q 2213/13097* (2013.01); *H04Q 2213/13103* (2013.01); *H04Q 2213/13141* (2013.01)

(56) References Cited

OTHER PUBLICATIONS www.wikipedia.es: c?digo QR. 27-1-12. [retrieved on Dec. 7, 2012] [retrieved from http://es.wikipedia.org/w/index.php?title=C%F3digo_QR&oldid=53314472].

International Search Report of PCT/ES2012/070061 dated Oct. 25, 2012.

* cited by examiner

TELECOMMUNICATIONS SYSTEM AND METHOD WHICH MAKES IT POSSIBLE TO ESTABLISH TELECOMMUNICATIONS WITH A VEHICLE USER BY MEANS OF THE NUMBER PLATE

CROSS REFERENCE TO RELATED APPLICATIONS

This is a National Stage of International Application No. PCT/ES2012/070061 filed Jan. 31, 2012, the contents of which are incorporated herein by reference in its entirety.

OBJECT OF THE INVENTION

A first aspect of the present invention refers to a telecommunications system which makes it possible to establish telecommunications with a vehicle user by means of its number or license plate. A second aspect of the present invention refers to a method for establishing telecommunications by means of said system.

The first aspect of the invention, namely the system, makes it possible to establish telecommunications with vehicle users in a direct and immediate way, by means of the public data of the same, thereby making it possible, amongst other options, to instantly resolve concrete communication needs of the user themselves or of third parties, i.e. of the vehicle user themselves, pedestrians or any other person, organisation or institution.

In a second aspect, the invention proposes a person to vehicle (P2V) telecommunications method, which implements said system, thus making it possible to offer the establishment of telecommunications with any vehicle user, via the public data of their vehicle, especially based on its number plate. The present invention makes it possible to develop a channel which resolves all the communication needs of any vehicle user, regarding the same, in a simple and direct way, by means of the network connection of vehicles via its number plate.

The application field of the invention is that of systems related to communication methods, telecommunication between people and, specifically, between vehicle users.

BACKGROUND OF THE INVENTION

We know that all vehicles driven in any country are publically identified using an international number plate system. This number plate system functions by each individual vehicle having a unique code or registration which identifies it, by means of the official public registry, as belonging to its owner, in such a way that it makes it possible to communicate with the vehicle owner or user.

Likewise, we know that there is a constant need to communicate with vehicle holders regarding many diverse aspects of their vehicle, whether administrative, legal commercial or simply the need for straight forward necessary or relevant information and whether these holders are legal or physical persons. However, despite this constant need, the management of information is very costly in both a technical and economic sense, as well as in terms of the energy used in order to achieve this goal or in other words, to establish communication with a vehicle user via the public information that currently exists. Currently, access to information and communication, for both private parties, companies and for the administration themselves, involves indirect, expensive and not very operative methods. Therefore, there is a problem in establishing contact or communication with vehicle owners in a quick and agile way.

Furthermore, in the state of the art, there are many automatic communication systems which allow vehicles to communicate with one another or vehicles to communicate with external devices, with which they exchange functional or useful information. They are inter-vehicle communication systems (machine to machine) into the development and implementation of which car manufacturers invest a large quantity of resources and in the processes of which people do not intervene, these systems making it possible to offer a wide range of communication services to the user, including active and updated information regarding traffic, safety, emergencies, incidents, recognition by means of OCR, GPS guidance and location, etc.

The communication protocols for said systems and processes are complicated, by means of automatic exchange systems for exchanging a large amount of information between vehicles, without the user intervening in the communication. Large companies in the automobile industry are working together with telephone and software development companies to design this kind of products and services. Services such as e-call, b-call, more sophisticated localisation means for stolen vehicles, systems which provide distance supervision on the mechanical state of the vehicle, which provide on road guidance or up-to-date information on the traffic situation etc., will be part of the packages mounted into vehicles by manufacturers in the near future.

However, in most of these cases, these systems no not allow a human transmitter to send a message or initiate dynamic communication with a vehicle user, with whom exchange is made or to whom information is directed.

EXPLANATION OF THE INVENTION

The telecommunications system and method object of the present invention makes it possible for any transmitter user to establish telecommunications with the receptor user of a vehicle by means of the number plate or in other words, using the number plate or registration of each vehicle. The method consists in automating a homogenous sequence of information or a code, generated by an algorithm which contains all the information needed to carry out the desired communication function or in other words, send the message. The latter is achieved by means of establishing communication between users, transmitter and receptor, based on using the receptor user's code, preferably formed by the country code together with the number plate and the code of the communication code desired to be performed, or function code, this function being chosen from a pre-determined number of pre-established communication functions. The general structure of the method does not change, any that are the characters or terms used to describe the communication function, the message made or the channel through which it arrives to the user. In this way, the information sequence formed by the message generates an algorithm which may be interpreted by a telecommunications application module or command interpreter and redirected to the receptor, linked to the number plate of the vehicle with which communication is desired.

Therefore, said algorithm implies at least one code, which comprises the number plate of the vehicle with which communication is desired, plus an information unit of a pre-defined or encoded communication function, in order to be incorporated or interpreted by the telecommunication application module or command interpreter, in charge or redirecting the output message from the transmitter to the receptor.

The telecommunications channel is formed from a network structure implemented to serve as a communications means via the internet and/or a mobile phone, mainly. A transmitter user may thus contact another receptor user via their online profile, with the public data pertaining to their vehicle, if it is as such it is established and for the pre-established functions which are activated in a database, without exposing any private data. This database will contain the public information pertaining to the vehicle as well as private information and preferences of the vehicle user or owner.

In this way, when a transmitter registered in said database wishes to establish "person to vehicle" communication with another user, who is also registered, using their public identification or number plate, be it in response to a pre-defined request of the receptor user or on their own initiative, and via any of the channels activated to such end by the users (for example SMS, e-mail, telephone call, web or mobile application or any other known channel) the aim is to successfully send a pre-defined code, according to the specific telecommunication function desired to be established, with the precise data, in order to be interpreted by a telecommunications application module or command interpreter, comprised in telecommunications system server. The body of the code, which includes the receptor's number plate, as well as the pre-defined function code, will preferably begin with the number plate of the network user's vehicle, followed by the international number plate code unique to each origin country (for example "E" for Spain and according to the international automobile initials of each country) this code being linked to the vehicle user registered in the network by means of said database. Based on this code, the message sent by the transmitter will be recognised, interpreted and redirected by the telecommunications application module towards the receptor, if this is registered in the database, by means of the telecommunications channels activated in their profile in the database. The key codification which follows the number plate in the text message generated by an algorithm which determines the type of communication received and the content of the same. The telecommunications application module, after having recognised and interpreted the message code, deciphers it and redirects it to the receptor device when the same is activated in the system.

The method, applied by means of the telecommunications application module or interpretation and management module for the commands corresponding to the codes linked to specific pre-established communication functions, on a public vehicle database, online, constantly updated and in which the private data is exclusively introduced and managed by the owners, holders or users thereof, makes it possible to establish immediate telecommunication between the same (i.e. they receive analogue telephone or VoIP calls, SMS, e-mails, notifications by means of data traffic via a native mobile application, etc.). via the public number plate code of their vehicle, at their will and once the system has been activated.

A telecommunications system according to claim 1 therefore forms a first object of the present invention.

Likewise, a second object of the present invention is a telecommunication method according to claim 9.

Based on the above, in order to run the communication functions according to the telecommunication method with vehicle users, it is necessary for the system to check the registration or a vehicle number plate, with which a transmitter user or first user already registered wishes to communicate or in other words, to verify the existence of the receptor user in the database and if said receptor user is registered in the determined system and will decide on which type of notifications of all those available, that said user has configured, as well as those communications channels preferred and pre-defined by the same. This facilitates a transmitter to receptor communication without the related parties knowing undesired personal data.

In order to initiate communication, the transmitter generates an output message composed of at least the following codification: country code+receptor number plate+pre-defined communication function code.

The message arrives at the telecommunications application module, programmed to analyse the message code and the registration and act as a result based on the preferences registered in their profile in the data base by the receptor, for example the communication channel, it being possible for the server to re-send the complete message to the receptor or only a notification that a message exists via the chosen channel for this purpose to the receptor. This output message from the server therefore corresponds to the communication function pre-determined and activated by the receptor user.

Finally, the receptor user registered in the data base and linked to the vehicle with which a first user wishes to establish communication receives the message, notification or notification sent by the first user or transmitter.

The method object of the present invention may be implemented in mobile terminal operative systems by means of its own native application, in which the code for each function appears "below" an interface, by way of function icon, so that the transmitter does not have to write the text message or function code but rather it is only necessary to introduce the number (number plate) of the user to whom the communication is directed into the application. In other words, the entire construction of the method codification is below an interface represented by means of function icons built into the communications terminal.

The method may also be run from conventional mobile telephones, by means of the command sequences described, whether formatted by means of templates or by means of individualised management.

In order to run the person to vehicle communication functions between a first transmitter user and a second receptor user linked to a vehicle it is necessary for the registration of the same (user existence) to be verified in the network database using the complete number plate (country code+number plate), as well as the various notifications that the user has configured and the pre-defined communication channels. This will facilitate transmitter to receptor communication without the related parties finding out unwanted personal data.

The following communication channels, amongst others, are contemplated: via a native application (communications and notifications managed by the mobile application), via web application (notification management module via the web), via SMS, via e-mail, VoIP or analogue call.

Each user will have a public profile in the system, which will depend on the personal configuration they give it. In response to the user configuration regarding privacy, each user will have a profile page assigned to them, where all the public information they wish to share or edit at any time is shown. Likewise, there will be a public profile for each vehicle or vehicles linked to each user. In response to the user configuration regarding privacy, each user will have both vehicle profile pages and pages for vehicles linked to this profile, where all the public information they wish to share or edit at any time is shown. The public profile of each vehicle has a URL which may be shared, which will grant access to the data marked as public by the user or open re. the vehicle.

This user profile is characterised in that it comprises an application programming interface (API), which enables the users to send, receive, store and recover message data, by means of which the user is able to manage the functions of the communications they wish to be active at all times as well as the way (channel) these are communicated to them, based on a relation matrix between the functions and the channels, in such a way the entire function that generates automatic notifications via any channel may be activated or deactivated at any time. Furthermore, where it is possible to choose the notification channels in an individual or multiple way (all, none or some).

A high/low/modification function for vehicles linked to the user who registered them will exist in the system. For this, the following is necessary:

- Number plate: will be the unique code for the vehicle in the application. The number plate will be formed by two parts in the country code (E for Spain) and the number plate itself.
- Registration date.
- Additional car data: the car data is loaded in series.
- Contact data: active user telephone and e-mail are loaded by default, although this may be modified for any telephone, e-mail and contact person.
- Other general vehicle data.
- Professional data of vehicle use.
- Vehicle inquiry data.
- Vehicle state data.
- Management/Modification/vehicle Discharge and Transfer.

When it comes to admitting the vehicle in the system, the same will verify that the number plate has not previously been registered, sending a notification in the event of the contrary. Access will be granted to the number plate search in order to find your vehicle and the user profile it is registered to.

The user may manage what information he shares and with whom at all times. Therefore, a data publication system will be established based on information tight vaults. Information to be stored in the tight vaults is defined as follows:

- User data: Log in, avatar, personal data, contact data, additional contact data, other data.
- Vehicle data: number plate, communication functions, state functions, make, model, version, mileage, vehicle are (PC), other general vehicle data, photo gallery, remaining general vehicle data; "My Vehicle" management.

On this information which the user wishes to share, it is possible to define visibility permissions for levels of visibility or the extent to which information to be shown on the profile is public. These levels range from the most open (public) to the most restricted (private). These vaults contain information that may be shown or hidden according to the user's preferences.

It is necessary for the user to be able to manage the pre-defined telecommunication services and functions that they wish to have active at all times, as well as the way or cannel in which the communication should take place. This will generate a matrix of the functions and channels. All functions will generate automatic notifications via a channel and may be activated or deactivated via this matrix. It is possible to choose multiple notification channels (all, none or some).

The system furthermore incorporates a function for showing the different "states" of the vehicle, which may be edited at all times, as chosen by their owner or user. The "states" may be represented by means of "icons". Therefore, for the visibility of this information, an icon will be shown on the public profile. It will be possible for this section to be managed by users, who define the various "states" that may or may not be made visible on the public profile. Examples of "states" defined by icons on the profile may include: vehicle for sale, vehicle active, active inbox, vehicle for sharing, vehicle stolen, etc.

The system has an inbox function. The inbox will be a common place for messages left by other users of the application, from any channel (voice, SMS, community, etc.). These messages may be text, voice or image messages. The inbox must also be capable of supporting HTML completely. It is possible to control the amount of messages sent to the same recipient in a period of time and total messages sent in a period of time. The receptor user is able to see the messages left in the inbox at all times via the web or mobile application. The inbox will have a message search filter, including text, associated number plate, date sent, etc. The inbox will contain the messages left in the vehicle's inbox. If it is such the message would be left marked with the number plate of the associated car. The user can edit or delete these messages. The inbox itself would be a function that the user may activate or deactivate.

In all communication via any channel established, a communication record is established. This record would be linked to the vehicle (by means of the number plate) and to the user who sends it. In this way, there will be two records, one for sent messages, associated to the user profile and another register for received messaged, linked to the vehicle in question. The information saved may include: transmitter user, message, chosen communication channel (SMS, email, application, etc.), communication date, receptor user (vehicle) or any other data considered relevant. This record will be in the application permanently but it is possible for the user to mark it should he wish to no longer view the current record (clean).

Likewise, there will be a profile search function (for vehicles) in the system. In order to access the profile search quickly, there will be a search engine (searcher) linked to the system database, in order to carry out the search according to the number plate and other criteria shown on public profiles. The search engine will generate results as text is introduced into the number plate (live search). This will generate a list of all the number plates that coincide with the search. Each element on the list will have a link to the user's public profile and to the vehicle's public profile.

Of the communication functions to be loaded, only those which are active are shown. Based on the information selected by the user in the communication functions, the application will be capable of sending the message received to the receptor by means of the configured channel. These functions may be, amongst others:

- Notification communication system (pre-defined messages)
- Sale system (P2V—SALE)
- Inbox (where any kind of message may be left)
- Functions on the geo-location of the terminal
- Etc.

The notification functions are functions which usually end in one single text message, which contain the useful information to be transmitted. They operate by means of a brief text with a key code ("BOTHER", "FINE", "DISTANCE", etc.) following the number plate code, when they arrive at the code management system, produce a pre-defined output message directed at the user, containing the notification so that the function is activated: "your car is causing bother", "you have received a fine", "somebody has approached your car", etc. Some notification functions that the server will be capable of analysing and managing automatically are as follows: free text, bother, fined, fine, contact, sale, share, reach, forgotten, courtesy, indicators, online, amongst many other possibilities.

Other particular functions of the system, as well as other characteristics of the processes additional to those already mentioned, are described below.

DESCRIPTION OF THE DRAWINGS

In order to complement the present description of the scope object of the invention and in order to facilitate a better understanding of the characteristics that distinguish it, the present descriptive specification is accompanied by a set of intrinsic drawings which serve as a non-limiting example thereof.

PREFERRED EMBODIMENT OF THE INVENTION

Below is a detailed description of the invention based on various preferred embodiments thereof.

Figure 1:
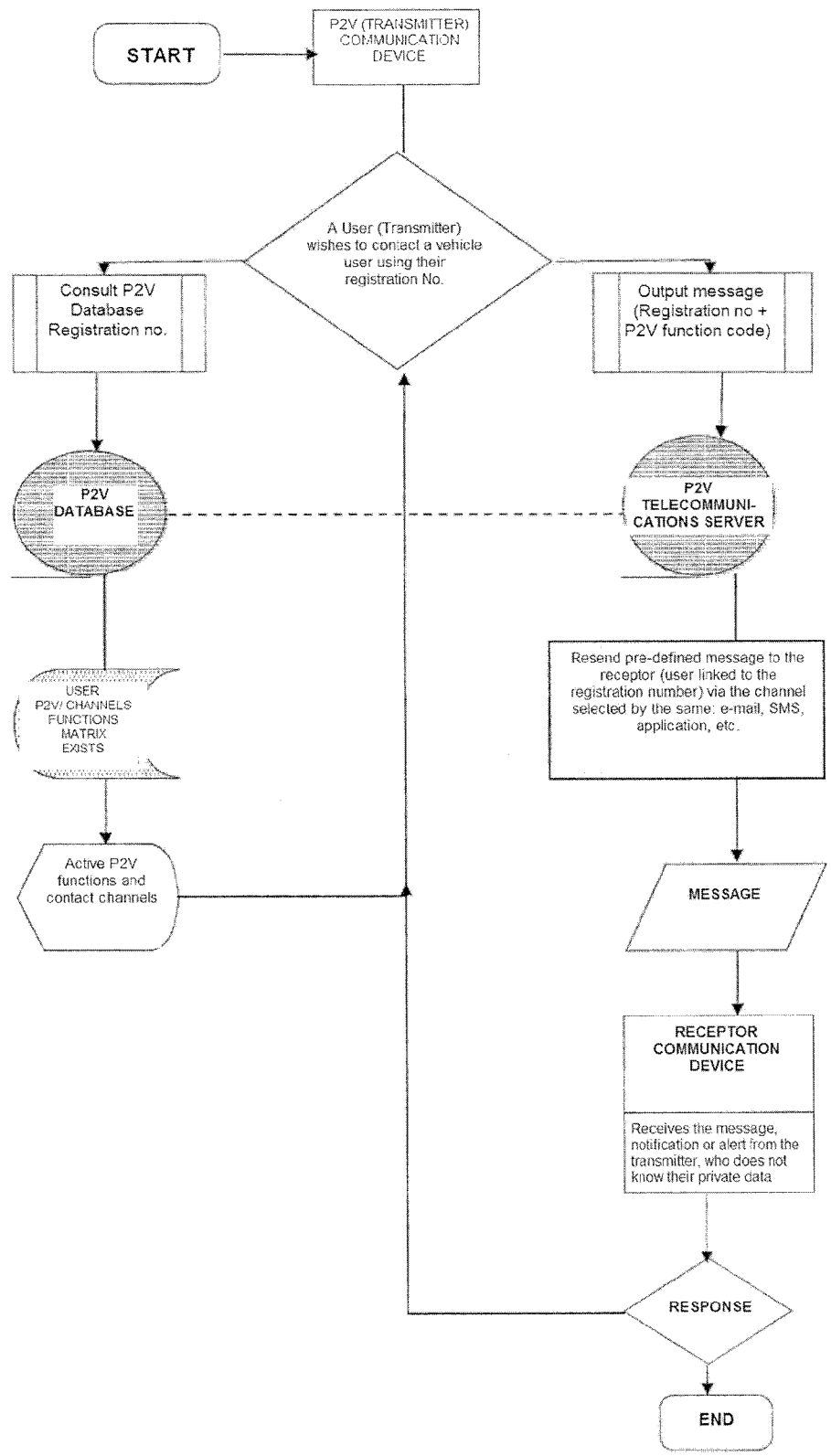
FIG. 1 is a diagram of the general telecommunication method, object of the present invention.

A first example of the telecommunications method, shown in a general fashion in FIG. 1, in accordance with the above description, object of the present invention, refers to the communication between two users registered in the database and therefore, in the system object of the invention, wherein one of the users has activated in said database a communication function pre-defined in the system.

In this diagram, the transmitter activates their communication device with the P2V (Person to Vehicle) system, object of the invention. Said transmitter user wishes to contact the user of a vehicle by means of the number plate of said vehicle, the number plate which the transmitter user may or may not know. If the number plate is not known, the P2V (P2V database) system database is consulted and if the number plate is registered in the P2V database, the system transfers the public information, such as active functions of the P2V system and the contact channels enabled, to the transmitter. If the number plate has not been registered in the database of the P2V system, the transmitter user will not be able to establish communication with the vehicle user.

On the other hand, if the number plate is found to have been registered in the database of the P2V system, the transmitter user writes the output message including the number plate and a function code which has been predefined in the system. The message is sent after having been codified by means of executing an algorithm, via the telecommunications application module and the telecommunications server of the P2V system, who re-sends the pre-defined message to the receptor or in other words, to the user linked to the number plate via the pre-defined channel selected by the receptor. The message is therefore received in the device chosen by the receptor, which is authorised to choose between answering the transmitter user or not.

Figure 2:
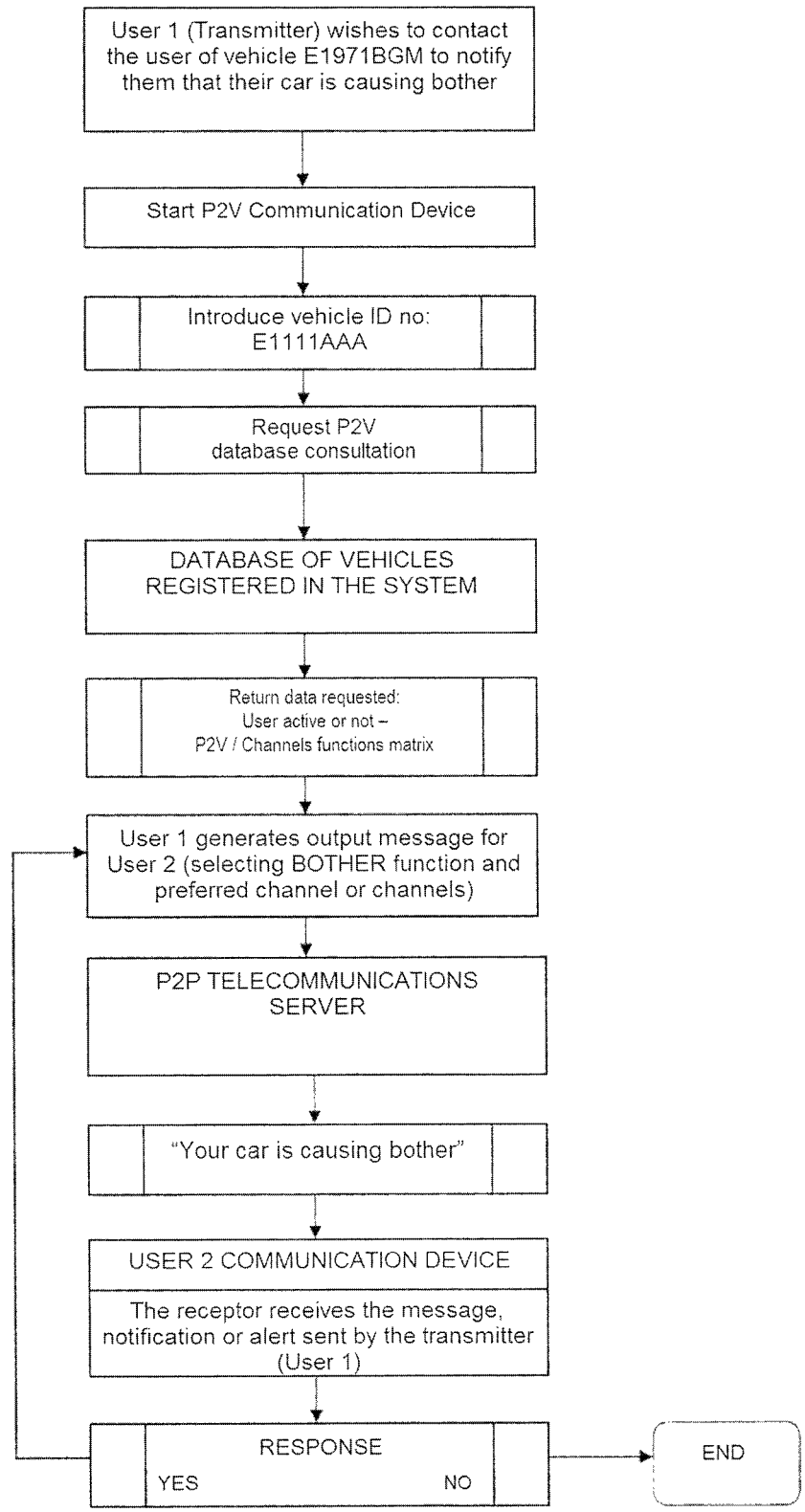
FIG. 2 is a block diagram showing a specific example to be applied in the telecommunication method, shown in FIG. 1.

In particular, the activated pre-defined function is the "Bother" function, an example shown in FIG. 2, which authorises the telecommunications application module that said user may receive alters on various occasions, on which their vehicle it bothering a third party.

In a situation in which a first vehicle is bothering a second vehicle, both vehicles being registered in the system, the user of the second vehicle or transmitter user wishes the notification the user of the first vehicle or receptor, the contact data of whom they do not know. The transmitter must firstly consult the database of the P2V system, in which each vehicle is registered and identified by means of its public number plate, in order to know whether the user of the vehicle he wishes to contact is registered in the system or database of the same. The system checks the receptor's register, and where appropriate, the various pre-defined communication functions defined by the same to this effect and sends a message to contact the receptor via the system, which checks that the receptor is registered, in such a way that said message comprises the public identification code or number plate and the pre-defined communication function code, which in this case would be "bother". An example of the codification of the message sent would be "E-1111AAA-BOTHER". This message is formed by: the country code+the number plate of the receptor (111AAA)+the pre-defined communication function code (BOTHER).

Via the telecommunications application module of the P2V system, the server receives the message via any of the channels activated to this end by the transmitter. The server checks whether the receptor is registered in the system, interprets the message and checks whether the receptor has activated the function that corresponds to the pre-defined function code included in the message. If this is so, the server re-sends an output message to the receptor, which corresponds to the communication function "BOTHER" via the preferred channel or channel defined by the receptor in the database.

The receptor receives the notification in the output message "Your car is causing bother" and may or may not respond to the same.

Another example, referring to pre-defined notification functions, refers to a transmitter carrying out the FREE-TEXT function, which equates to the user sending a determined text message for a specific receptor, provided that the receptor has enabled the possibility of receiving this kind of communication. The message to be sent by the transmitter would be coded as follows:

Country code

Number plate

Function code (FREE-TEXT)

Free text introduced by the transmitter

The code may for example be "E-1111AAA-FREE-TEXT"-"Text the transmitter wishes to send". This text would be copied literally into the output message sent from the server to the receptor, which would generate a notification to the receptor user, via the channels activated by the same, which may include:

SMS channel: the free text message is sent and a link to the user profile.

E-mail channel: the free text message is sent and a link to the user profile.

Web or mobile channel: the free text message is sent and a link to the user profile.

Other.

Another example, in which a transmitter wishes to carry out the pre-defined "CONTACT" function, would result in a generic contact with the transmitter request message being send. Following the previous structure, the message would be coded as follows:
Country code
Number plate
Function code (CONTACT)

In this case, the code would be "E-1111AAA-CONTACT". This message sent by the server to the receptor user would generate a notification to said user, which may be:
SMS cannel: the "Establish contact with me" message is sent and a link to the user profile.
E-mail cannel: the "Establish contact with me" message is sent and a link to the user profile.
Web or mobile cannel: the "Establish contact with me" message is sent and a link to the user profile.
Other.

The system also comprises a sub-system of automated responses. Some of the pre-defined functions of the service end in one single message or notification (for example the notification functions) but others would start a two-way communication between users. For this reason, for certain pre-defined functions of the communication method which imply an information exchange or communication between two registered users, it is possible for the receptor user to have an automated response or responses system, which is activated with the initial message received. Therefore, the telecommunications application module, via the server, automatically manages the messaging, in such a way that after receiving this first message, it responds with an automatic reply message. This automatic reply message will have been previously introduced into the system, by the receptor user registered in the network, by means of a profile tool designed to insert automatic response texts, images or sounds for replying to the pre-defined communication messages. The automatic response system will be highly useful to the user in terms of determining service functions, especially those concerning commercial transactions, sale, information etc. making it possible to automate all the data exchange processes (the response information of which is introduced into the message just once).

For example, when the SALE FUNCTION is being used, by means of which a user determines that their vehicle is for sale, the automatic message management system, after receiving the message from the transmitter interested in buying the vehicle, responds with an automatic reply message containing all the data of the offer in a sale announcement text and the contact means or data that the user wishes to include, a link to the profile online and even the possibility of attaching images or sending a MMS with photos of the vehicle etc. This automatic reply message will have been previously introduced into the system, by the user registered in the network, using a template of the profile designed to insert automatic reply texts for replying to the pre-defined communication messages.

The SALE FUNCTION implies an application of the telecommunications system and method object of the present invention which is currently not resolved in an efficient or sufficient way by the telecommunications systems or processes known or it is not possible to deduce this from them. Therefore, in order to facilitate the management of the same announcement, the user will have a tool or function on their profile, which grants access to a virtual template, which enables the user to manage the sale of their vehicle in an automated way. The user may publish theft message or offer via the various system channels by means of a vehicle for sale symbol on their user profile, publication on an internal buying/sale page or telecommunication function activation of the system—Sale. The transmitter may even generate a standard announcement to publish on external support such as internet advertisement portals. If the management of the sale is carried out via the mobile application, the same would be capable of redirecting to the sale profile (either integrated the buying/selling profile from the terminal and therefore also loading the sale profile or only launching the browser by default and loading the profile).

It is possible that the user with the vehicle for sale employs the return communication function of the system—SALE. Using this function, when a transmitter sends a message, it is possible to generate a response message for the transmitter automatically, containing the web address of the sale profile or a pre-defined message previously introduced into the system by the user. Be it by means of establishing a call, SMS, e-mail or any of the channels enabled to this end, the server, via its notification management function, after having received a message expressing the interest of any transmitter, responds with an automatic reply message, containing all the offer data, by way of a for sale announcement text and the means or contact data that the user wishes to include, a link to the profile online and even the possibility of attaching images with photos of the vehicle, etc. This automatic reply message will have been previously introduced into the system by the registered user.

As mentioned above, communication channels are understood to be the means used to transmit the messages from a transmitter to a receptor via the server. The receptor user is the party responsible for choosing which functions they wish to receive and the channel used for each one of these functions. Channels such as the following are used:
SMS Channel: if communication is established with the receptor by SMS, messages will be sent along a message sending pathway, which based on the number plate, generates a message to the telephone number of the user who owns the vehicle. The output of an SMS from the transmitter may be carried out in two ways: by means of a sending service from the application to the server (sending pathway) or via a PREMIUM number.
E-mail cannel: if communication is established with the receptor via e-mail, it will be carried out by means of an SMTP e-mail server.
Web or mobile application channel: if communication is established with the receptor via the application, a notification (notification) is generated in both the mobile application (pertaining to the mobile operative system itself) and in the web part, accessing the private user area. These notifications are automatically marked as read once they are opened and are moved into the record, only those notifications which have not been read being shown.
By means of analogue call: this method consists of calling a telephone number pertaining to the system, to which the number plate with which contact is desired is indicated. This, alongside the application module and the server, will indicate whether or not the number plate pertains to a user who is active in the system and will re-send the call to the telephone number (hidden) linked to the number plate in question as appropriate. This may be carried out from a conventional mobile telephone or from a native application built into a smartphone. In the event of the receptor user having the voice "call" function activated, the number plate is sent to a telephone number pertaining to the system, for example a 900-2, which is already built into the application. Using this common number, a call diversion is made to the receptor's telephone number (hidden) associated with its number plate code. An analogue call is routed, from mobile to mobile, from the telephone to the transmitter towards the receptor's telephone.

VoIP channel: if communication is established with the receptor via voice data protocols via IP, it will be necessary to build it into the application for direct communication by means of the number plate. It is also possible to integrate the VoIP communication via external programs, such as Skype or Gtalk. The user data relevant to these services is collected (if introduced) and the application "will manage" the call from the transmitter to the user (receptor).

Likewise, the telecommunications method may be implemented in the mobile terminal operating systems by means of a native application, in which the entire method architecture is below an interface represented by function icons integrated in the communication terminal. This native application is designed to be implemented into last generation mobile terminal operative systems of (smartphones), therefore enabling the transmitter and the receptor to use it to manage the telecommunication method object of the present invention in both directions, i.e. transmission and reception. This application for mobile devices makes it possible to access the web application (APP P2V) via smartphones and their screens.

In order to carry out the communication functions described from the mobile application (APP P2V) according to the example in FIG. 2, it is equally necessary for the registration of a complete number plate (country code+number plate) to be verified using the same, or in other words, for the existence of a user in a database of the system and the various notifications that the user has configured to be verified, as well as the pre-defined communication channels: application (communications and notifications managed by the mobile application), web application (web notification management module), via SMS, e-mail, VoIP, analogue call, etc.

The system will only load on the device pertaining to the transmitter who wishes to send those functions that the receptor has activated in a message to a receptor user. For example, a user might choose, amongst other things, the following: A notification communication system (pre-defined messages), a buying-sales (P2V-SALE) system, inbox (where any type of message may be left), terminal geo-location functions, etc. Likewise, a search tool or engine is available in the application, which enables search by number plate in the mobile application, in such a way it is possible to search for a user profile using its number plate, the transmitter user being shown the public page of the selected profile. This public profile will consist of that data which the user registered in the database wishes to shown on their profile and other screens with the public data of their vehicle or vehicles, as well as the communication functions they have activated and the channels via which they wish to or can receive communications. Using this profile page, a link to the communication method, object of the present invention, will be made available. In this way, the communication request, i.e. the transmitter sending a message, may be sent in the following ways:

Introducing the desired number plate into the application search engine (SCREEN SEARCH) by means of writing or voice command. This search will generate a link to the options of the vehicle user searched for, as well as the communication functions and reception channels they have enabled.

Naturally, if the receptor vehicle is not registered in the system, the same would inform of its inexistence.

Via a character recognition screen: by means of an image of a number plate captured with a telephone camera, with an OCR, which will launch the request from the mobile application and will skip an notification in order to carry out the search according to the data recognised. The search will generate a link to the options available for the vehicle user searched for, if they do indeed exist in the system and if not, their inexistence will be informed of.

Once the message has been sent, the operation of the method from the mobile application itself comprises the same stages as those described above for the general method, shown in FIGS. 1 and 2.

Figure 3:
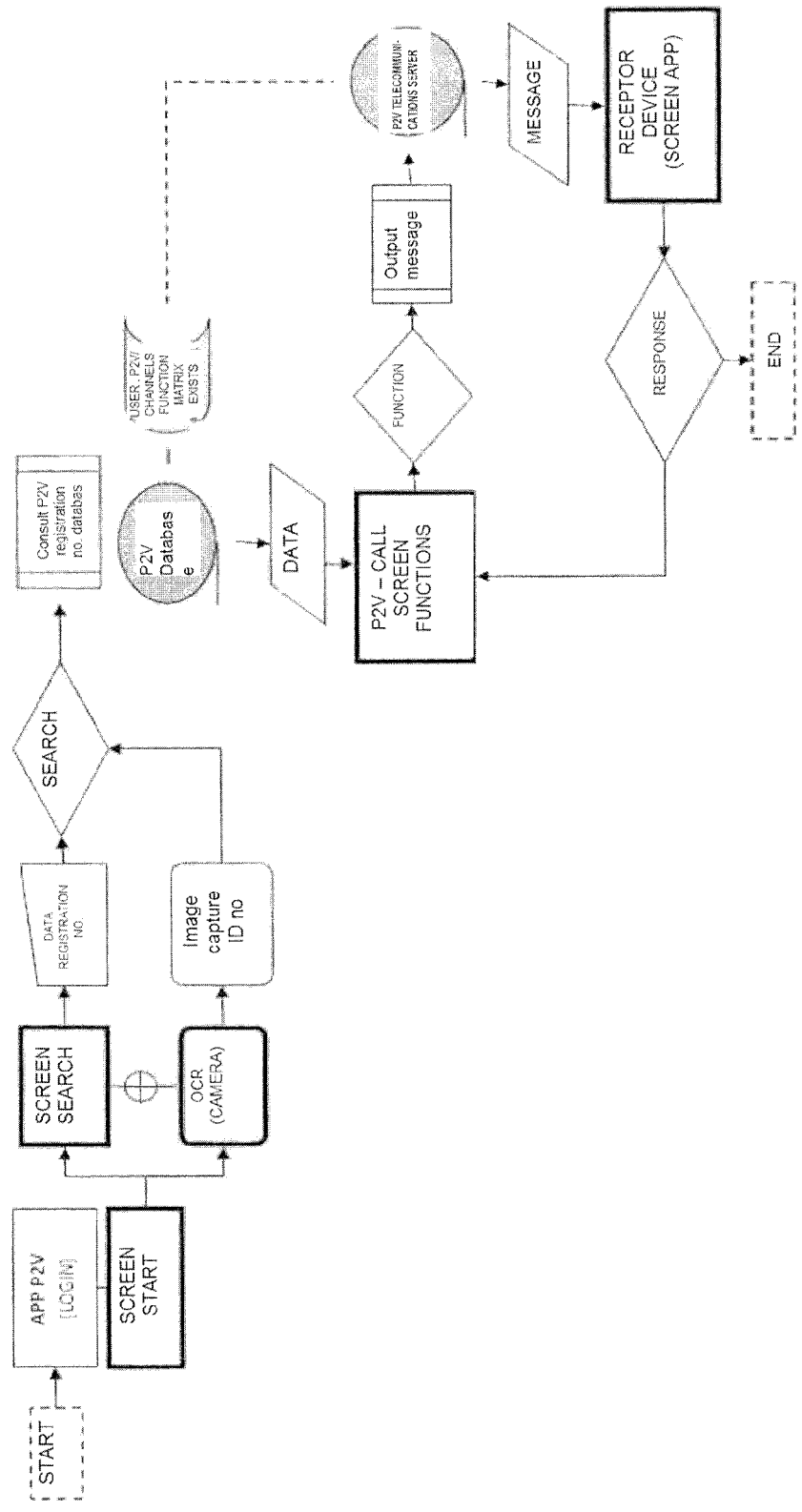
FIG. 3 is a diagram of the general telecommunications method from a mobile application in the transmitter device.

Below, two examples of specific embodiments of the telecommunication method from a mobile application are described, following the method described above in FIG. 3 and with reference to the pre-defined notification functions, as they are the operating means used by a transmitter of the FREE TEXT function (FIG. 4) which equates to the user sending a certain text to a specific user and a transmitter carrying out the SALE function (FIG. 5), which equates to a sale notification being sent to a specific receptor, provided that the receptor has enabled the possibility of receiving this kind of communication.

In both examples, the user 1 wishes to communicate with the user 2 via the number plate of their vehicle, E1111 AAA, either to send them a free text message or to express their interest in their vehicle for sale. For this reason, the user 1 starts the mobile application up on their device via the screen of the same and introduces the number plate either by means of typing it or by means of voice or using the camera (OCR) in the device. Once the number plate code has been introduced or recognised in the same, the application requests that the database of vehicles registered in the system is consulted in order to verify whether or not this number plate has been registered in this database. The database returns the data requested, mainly if the user 2 is registered and/or if they are active, as well as the functions and channels that said user 2 has activated, in the event of the same being registered in the system. If the user 2 is registered in the system, the user 1 displays the active system functions for the user 2 on the screen of their device via the mobile application and selects the function in which they are interested.

Figure 4:
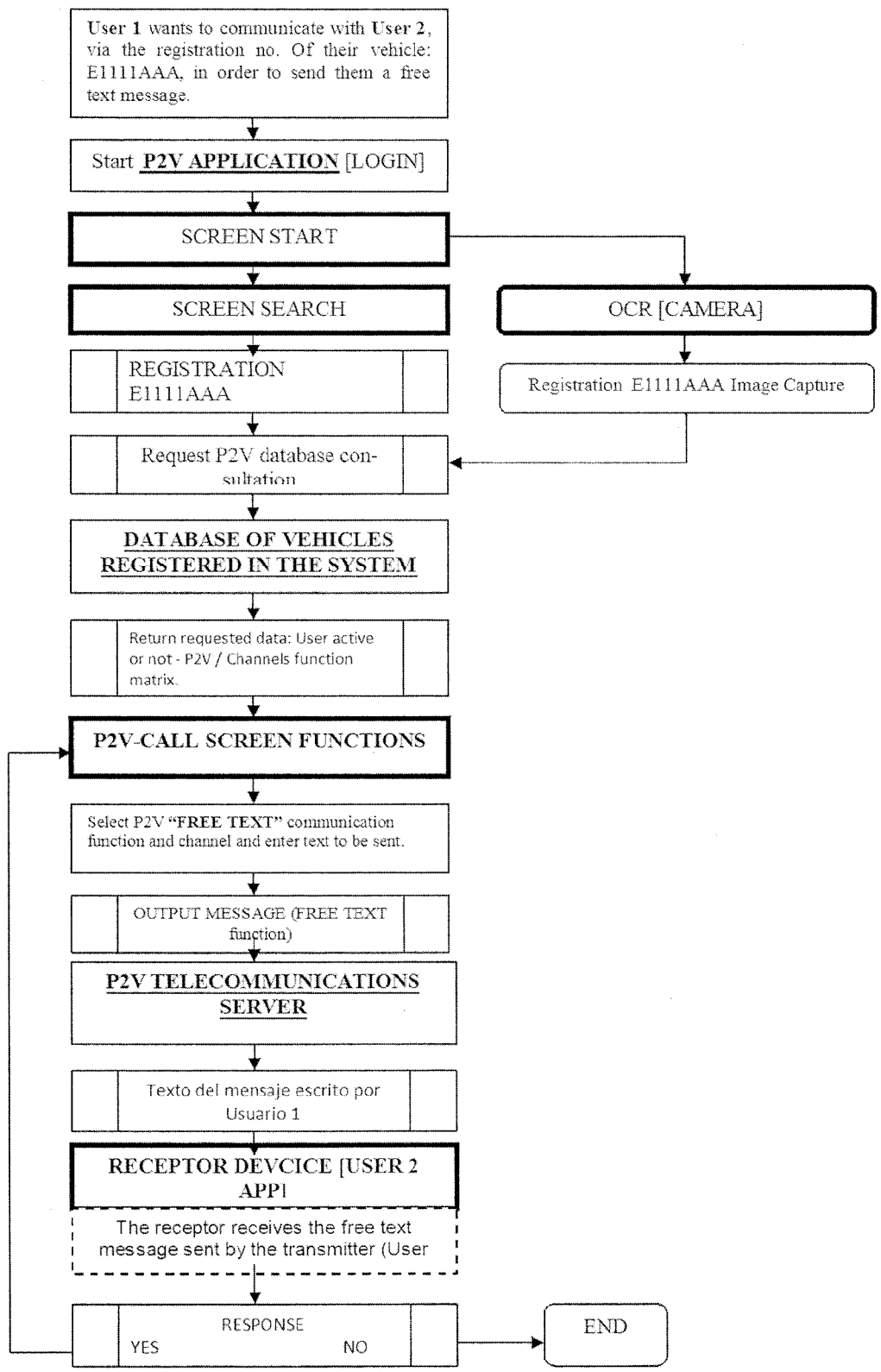
FIG. 4 is a block diagram of a specific example to be applied in the telecommunications method shown in FIG. 3.
Figure 5:
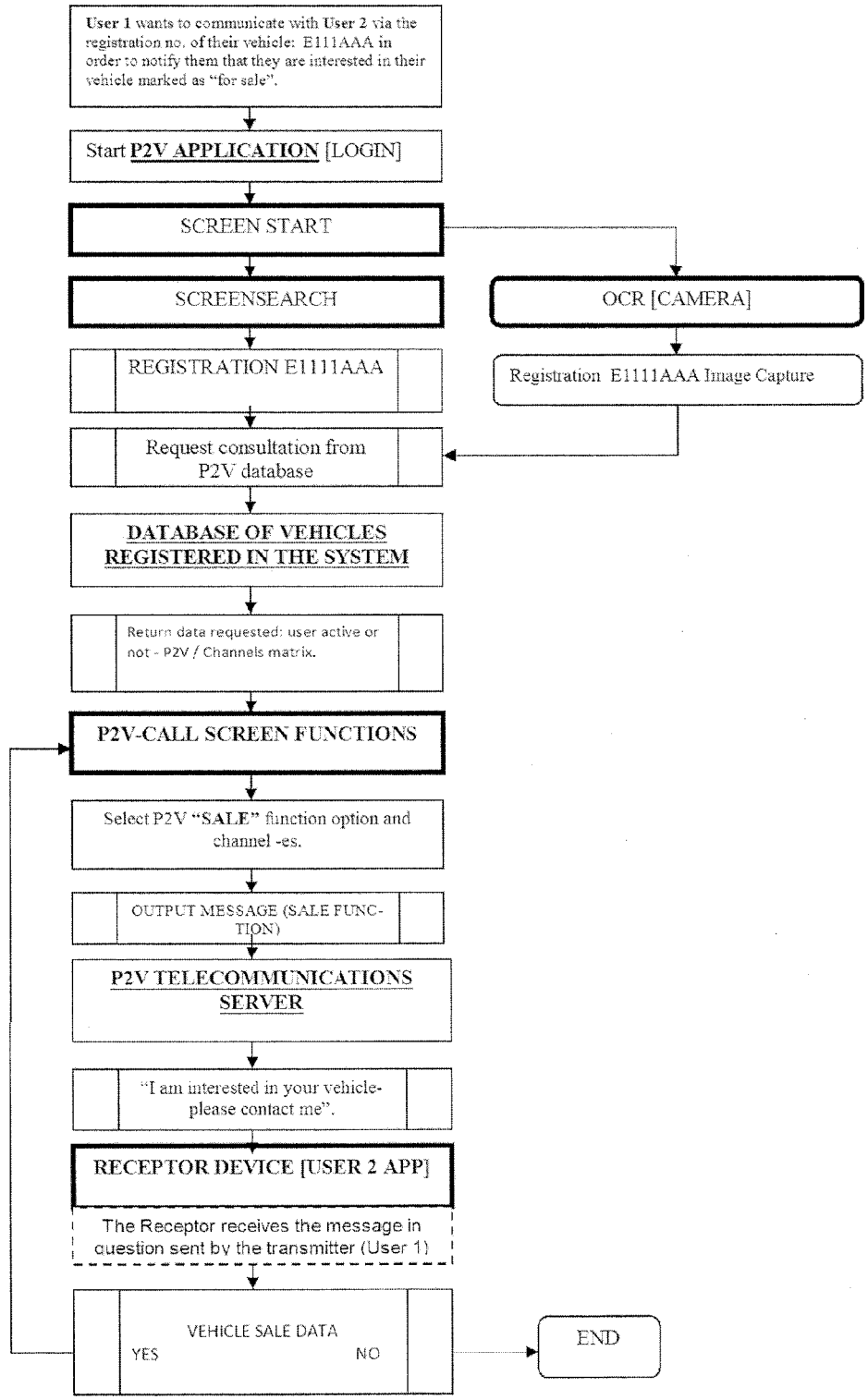
FIG. 5 is a block diagram of a specific example to be applied in the telecommunications method object of the invention, applied to the sales function, from the mobile application.

In the example in FIG. 4, the user 1 selects the sending channel and the pre-determined function, "FREE TEXT" and writes the text to be sent, whilst in the example in FIG. 5, the user 1 selects the sending channel and the pre-determined function "SALE".

Subsequently, the output message is sent composed of at least the following codification: country code (E)+receptor number plate (1111AAA)+pre-defined communication function code, FREE TEXT or SALE, depending on the example.

Based on the configuration, the receptor and the communication means, the telecommunications application module and the server re-send the output message to the receptor or in other words, to the user 2 linked to the vehicle by the number plate 1111 AAA, thereby generating a notification via the channel previously selected by the user 2.

The user 2 receives the message emitted by the user 1, for example in the example in FIG. 4, the free text written by user 1 is received whilst in the example in FIG. 5, the user may receive a pre-defined text, for example "I am interested in your vehicle. Please contact me".

User 2 receives the message preferably via their mobile application installed on their mobile device, to which they may or may not respond as they wish.

This mobile application may manage various communication channels, such as: application channel, SMS channel, E-mail channel, analogue call mobile channel and VoIP channel, etc., already described above.

In addition, there will be a specific channel or "Application" CHANNEL, which operates in the following way: If communication is established with the receptor via the application, a notification is generated in both the mobile application (pertaining to the mobile operating systems) and in the web part, accessing the private user area. These notifications are automatically marked as read once they have been opened and will be moved to the record, only those notifications which have not been read being shown. An example of this communication process would be:

The transmitter generating an output message with a message code, a number plate and the communication means.

The server analysing the code, the number plate and the communication means and generating a notification in the web part and in the mobile application pertaining to the receptor user.

The abovementioned application implemented in the mobile terminal operating systems has, as already mentioned, various functionalities or characteristics, such as:

Registered users managing the services of the communication method they wish to have active and the channel or channels for establishing communication with them, thus generating a matrix of the functions and channels. All functions that generate automatic notifications via any channel may be activated or deactivated, it being possible to choose multiple notification channels or in other words, all, none or some.

Generating a communication record independently of the cannel established. This record will be linked to the vehicle by means of the number plate and by extension, to the user who transmits it. In this way there are two records, one for the sent messages, linked to the user profile and another record for received messages, linked to the vehicle in question. The information to be saved may be: the transmitter user, message, communication channel, date, receptor user (vehicle), etc.

Inbox function, inbox being understood to be a place where messages are left for the application user, related to a number plate and the messages being generated via the mobile or web application. These messages will be of free character and the user may upload text or images in the form of a gallery, etc.

OCR (Optical Character Recognition) systems—in such a way that the mobile application will support the possibility of recognising a number plate via a recognition of characters by means of the camera in the device or terminal. The application thus initiates on a visual recognition system, i.e. a program which recognises objects in a visual environment (photographic images) and starts searches or launches a communication from them. The system may be applied for both specific users and for automatic information exchange protocols and may interact with public or private number plate recognition systems, i.e. those communication means which are carried out automatically based on a number plate (OCR) recognition programme, such as a communication transmitter or communication sequence indictor, which ends in a message or a service to the profile linked to the specific number plate. For example, in car parks, toll roads, etc. to immediately notify of a radar fine, in order to control traffic or breaches of vehicles causing bother, badly parked vehicles, via the mobility cars from the town hall which have an OCR on the roof and photograph and send fines as they operate, etc. This system makes it possible to manage applications, functions and services for all those needs or messages started in a number plate recognition programme mounted by a machine. In these cases, the message transmitter is not a user linked to a vehicle but rather a machine with access to the server which will send the specific message to the receptor user.

The use of the telecommunication system and method described in the present invention, combined with number plate recognition systems (OCR), involves applications which are currently not resolved in an efficient or sufficient way by known telecommunications systems or methods or it is not possible to deduce them from them. For example, an internal communications system. Therefore, the invention makes it possible to implement an anti-theft security service or system in the telecommunications system described, by means of the application of a communication protocol with the OCR number plate recognition networks, both public and private, which exists in any developed county. In this way, once the communication function has been activated and linked in the user profile of the stolen car, in an environment in which the system can exchange signals or interact with the various registration recognition systems with terminals located at different strategic points (car parks, motorways, petrol stations, toll roads, etc.,) it is possible to articulate a control network or "grid", by means of which a vehicle indicated as stolen cannot drive in theory without its position being detected, in this way constituting an effective anti-theft system. Likewise and as a complementary means, the user from whom the vehicle has been taken may convey their situation on their profile, using a stolen vehicle icon which may be activated. In this way, anybody can access the public data on the vehicle profile online and may communicate with the user to ask whether they can offer any information on the matter. For example, if anybody has seen the car in the street and it caught their attention, they would be able to immediately check by going onto the website and searching the registry to see if this vehicle is listed as stolen.

Likewise, the process may include the application with systems and functions of augmented reality, in such a way that all the functions of the application are built into an augmented reality function, which returns all the useful information, active system communication functions, public data on the user profile etc., on the image of the environment which shows the terminal camera at all times.

Management of the method by means of voice control systems, needed when the mobile device is being used whilst the driver is at the Wheel. The mobile application for managing by means of a voice recognition system, to be able to verbally dictate all data input, in addition to being able to carry out all communication functions by means of voice command.

Geo-localisation functions or solutions related to system functionalities, for the geo-localisation of the user by means of integrating the application with the GPS function of the mobile terminal operating system (smartphone). It would be possible to activate the various communication functions of the system on the map of the surrounding area in which the user is located. Other users can therefore see the respective area on the map via their GPS, the pre-defined communication functions of the system activated by the users via different icons shown on the virtual map. The use of the telecommunications system and method described in the present invention, combined with geo-positioning systems (GPS) implies applications which are currently not resolved in an efficient or sufficient way by the telecommunication systems or processes known about or it is not possible to deduce them from this. For example:

The invention makes it possible to implement a "system and method for geolocalising parking on a surface" in the telecommunication method described. Said method consists of implementing a method which makes it possible to synchronise request and demand communication functions related to parking needs using geo-location (GPS) support in the communication system. In this way, those looking for a place in a specific area of the city may transmit a request signal which would be received by those who are leaving a place in the same area. All of these communication or request signals and the signalisation are automated by default, in such a way that in unfolding the map of the area in question, those looking for parking will find the position of all the vehicles leaving their place and may visualise all the possible gaps that have just been freed. The method makes it possible to "synchronise" the demand for parking surface for a vehicle user, with the offer of free spaces left by other car uses, which indicate as such via the system.

Likewise, the invention makes it possible to implement a function for exchanging points of view on the various vehicle users in the telecommunications method described, by means of geo-localisation, by means of GPS system support and via the camera of the terminal. Therefore a user may select the point of view of another user who has it activated on an area map and reflect on it, the "EYES" function and see the environment in which the same is located through their camera. By exchanging points of view between the system users, it is understood that each user can access the surrounding view of another network user. Therefore, in addition to implementing the service in the system, a mobile device with a camera plus GPS is required. The function brings visual environment functions together with geo-localisation functions to make it possible to view, via the camera signal of another user, in any remote place, via the point of view of a second user, connected to the communication function, both inside the vehicle with which it is moving as though outside the vehicle. In addition, the user may also connect to the signal of other devices with built in cameras, such as traffic cameras, car park cameras and cameras in large surfaces, etc. The function makes it possible for a user, amongst other useful functions, to visualise directly and in remote places of "traffic states", car parks, roads, incidents or any other visual information they may be interested in.

The invention claimed is:

1. A telecommunication system which makes it possible to establish telecommunications with the user of a vehicle via a public code of its number plate, in order to send messages or notifications to at least one vehicle user via the public code of its number plate, amongst other tasks, comprising the following components:
a transmitter device with telecommunication capacity suitable for sending at least one output message comprising the number plate of a vehicle with which communication is desired, plus a pre-determined communication functionality code;
a dedicated algorithm which is generated by a sequence of information which forms said output message from said transmitter device, said message comprising at least one number plate of a vehicle coded by a codification system and a pre-defined communication functionality code;
a codification system for coding the output message which comprises the coded at least one number plate of a vehicle and a pre-defined communication functionality code, in such a way that it generates an algorithm formed by at least one number plate, which identifies a user plus a pre-defined communication function,
at least a database which comprises a set of records and fields, both public and private, linked to vehicles, to the users of the vehicles and to the telecommunication devices of the users, at least one of these public records being the vehicle number plate and a preferred communication channel being built in, as well as a series of communication functions which have been configured and/or activated by the users;
at least one telecommunications application module or command interpreter built into a server, programmed to provide a consultation service to said database based on the reception or input of said output message issued from the transmission device directed to a vehicle user, using the number plate of said vehicle, said server being applied to a previous sending of an output message via a pre-determined communication channel, which responds to the communication function code included in the input message to the server, in such a way that said application module interprets the algorithm and redirects it to a receptor linked to the number plate of the vehicle with which it wishes to communicate; and
at least a receptor device with telecommunication capacity, linked to a user and to at least one vehicle registered in said database, which receives the output message from the server via a preferred pre-determined communication channel.

2. The system according to claim 1, wherein the devices linked to the users have an application adapted to send automatic responses in relation to the type of message delivered to the receptor and the pre-determined communication function thereof.

3. The system according to claim 1, wherein the database comprises public data on vehicles and private data on the vehicle owners, each vehicle being registered and identified by its public number plate and the private registries being exclusively introduced and managed by the vehicle owners.

4. The system according to claim 1, wherein said codification system comprises means for automating a homogenous sequence which contains the information needed to carry out the desired communication function or message, wherein the message is formed at least, by the vehicle identification registry in the database and the function code of the communication desired to be carried out.

5. The system according to claim 1, wherein said transmitter device linked to a user is registered in said server, in such a way that the output message from the transmitter device coincides with the output message of the server, when the server communicates with various devices.

6. The system according to claim 1, wherein said telecommunications application module has a built in geo-localization system in order to geo-localize the telecommunication device linked to a vehicle based on said database.

7. The system according to claim 1, wherein the telecommunications devices registered in the database comprise internal or native applications for establishing communication with other devices.

8. The system according to claim 1, comprising an application programming interface (API) which enables users to send, receive, store and recover message data, thereby enabling a user to manage the communication functions in which the user wishes to have active at all times, as well as the way (channel) of communicating with the, based on a relation matrix between the functions and the channels, in such a way that all functions that generate automatic notifications via a channel may be activated or deactivated at any time.

9. A telecommunications method which makes it possible to establish telecommunications with a vehicle user by means of the public number plate code of the vehicle, in order to send notifications or messages to vehicle users, amongst other tasks, via the public number plates, the method comprises the steps of:

registering as a user in a database of vehicle user entries, which comprises public and private information on users and the user's vehicles, said registering including at least an identification of a telecommunications device linked to said user and a number of telecommunication preferences;

codifying an output message linked to the user registered when the user wants to communicate with at least one vehicle via the number plate of the vehicle, said message including a codified number plate of the vehicle with which communication is desired, plus a pre-determined function code;

sending said output message from a telecommunications device pertaining to the user registered to a telecommunications application module or command interpreter built into a server programmed to provide a consultation service to a database based on the receipt in said telecommunications module of said output message from a transmitter device directed to a user;

consultation, by means of said server, to the database of vehicle user records in response to said output message transmitted by said registered user, in order to check whether the number plate included in the message and linked to the vehicle with which communication is desired is registered in said database;

sending, by means of a dedicated algorithm, a codified output message from the server, the text or format of which corresponds to a pre-determined communication function and which is interpreted by said telecommunications application module after having been verified in the database of vehicle user registers that the vehicle user with whom communication is desired is a registered user in the system, and subsequently transmitting the message or notification sent by said registered user to the desired vehicle; and receiving the message by a receptor (user registered in the system), which also receives a notification or alert sent by the transmitter via the available channel or channels selected by the receptor.

10. The method according to claim 9, wherein said output message is composed by at least the following: country code+ receptor's number plate+pre-defined communication functionality code.

11. The method according to claim 9, employing an application programming interface (API), which enables users to send, receive, store and recover message data, making it possible for a user to manage the communication functions the user wishes to have active at all times, as well as the way of communicating with the user, based on a matrix related to the functions and the channels, in such a way that all functions that generate automatic notifications via any channel may be activated or deactivated at any time and where it is possible to choose individual or multiple notification channels.

12. The method according to claim 9, wherein said output message from the server is sent to the telecommunications device pertaining to a first user if the number plate of the vehicle with which communication is desired is not registered in the database, wherein the message notifies the user of this circumstance.

13. The method according to claim 9, wherein said database is updated and modified in real time with information provided by users registered in the database and in that said database is updated and amended at pre-determined intervals.

14. The method according to claim 9, wherein the sending of messages between the registered user and the server as well as between the server and a user is carried out by one of the following communication channels or by a combination of the following: text messages, web or internet communications, e-mail, voice communications and/or analog telephone means, communication via native application pertaining to the server and/or video devices and communications.

15. The method according to claim 9, wherein sending the output message from the first user is started from a photographic image captured by an optical character recognition means (OCR), such as a camera, arranged in the communication device pertaining to the first user.

16. The method according to claim 9, comprising a search function or search engine for searching for vehicles based on its number plates in said database.

17. The method according to claim 9, wherein the devices associated to the users have an application adapted to implement an internal anti-theft security system or service in the telecommunication method described, by means of applying a communication protocol with the OCR number plate recognition networks, both public and private, in such a way that when said communication function is activated and in an environment in which the system can exchange signals or interact with the various number plate recognition systems with terminals located at various strategic points, a control network or "grid" is articulated, by means of which a vehicle listed as stolen cannot drive without its position being detected.

18. The method according to claim 9, wherein the devices linked to users have an application adapted to implement a surface parking geo-localization system and method in the telecommunications method described, by means of geo-localization (GPS) system support, which enables users to synchronize application and request communication functions related to parking needs, in such a way that users looking for parking in a specific area of the city can transmit a request signal which may be received and answered by users who are coming out of a place in the same area requested.

19. The method according to claim 9, wherein the devices linked to the users have an application adapted to implement a function for exchanging points of view of different vehicle users, by means of geo-localization, by means of GPS system support and via cameras of the user's communication devices or terminals, in such way that a user may select the point of view of another user who has activated and displayed a visualization function described on an area map and access the image of the environment of another user in real time via the camera signal of the another user, thereby enabling users to have access, amongst other tools, to live visualization of remote places such as traffic states, parking, roads, incidents or any other visual information.

20. The method according to claim 9, wherein the devices linked to the users have an application adapted to implement an internal vehicle sale system in the telecommunication method described, with an automatic messaging management system, which enables a seller, after having received the message from a transmitter device expressing interest in buying the vehicle, to respond with an automatic reply containing all the data of the offer by way of sale advertisement text and the contact means, or data that the user wishes to include, said automatic response message having been previously introduced into the system by the registered user, by means of a template designed to insert automatic response text to the predefined communication message.

\* \* \* \* \*